Aug. 6, 1957 R. E. BACHMAN 2,801,720
TRIPLEX MAGNETIC CLUTCH
Filed March 21, 1955
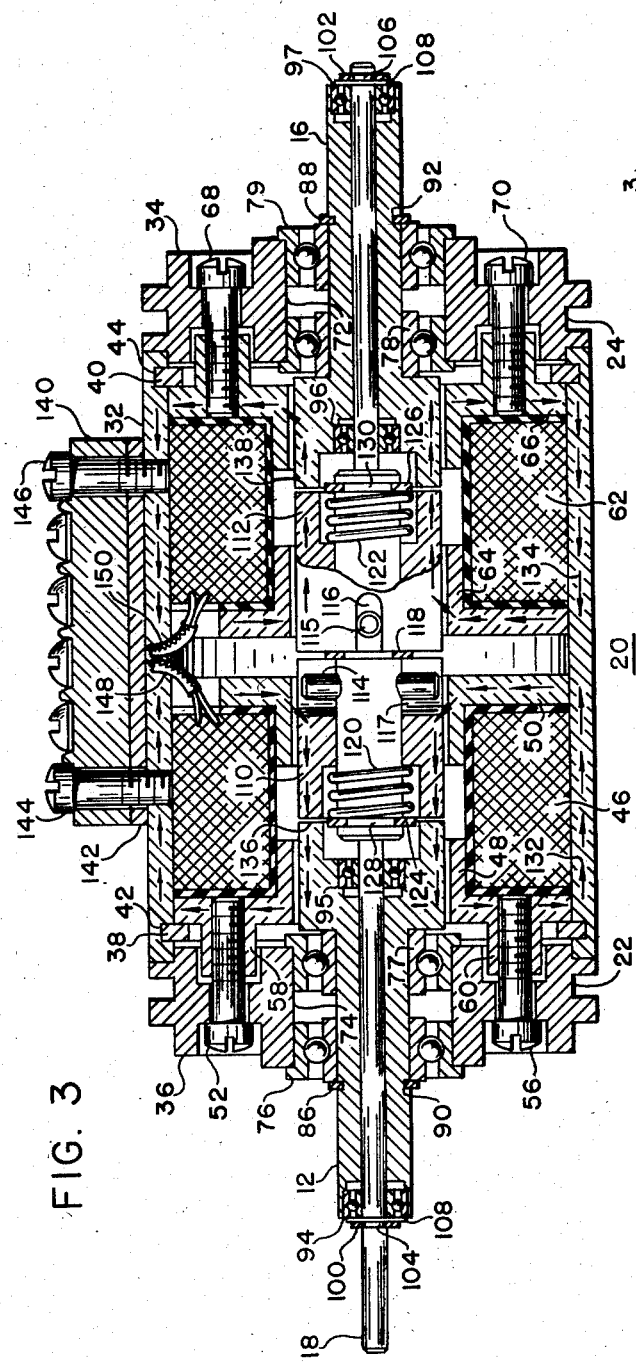
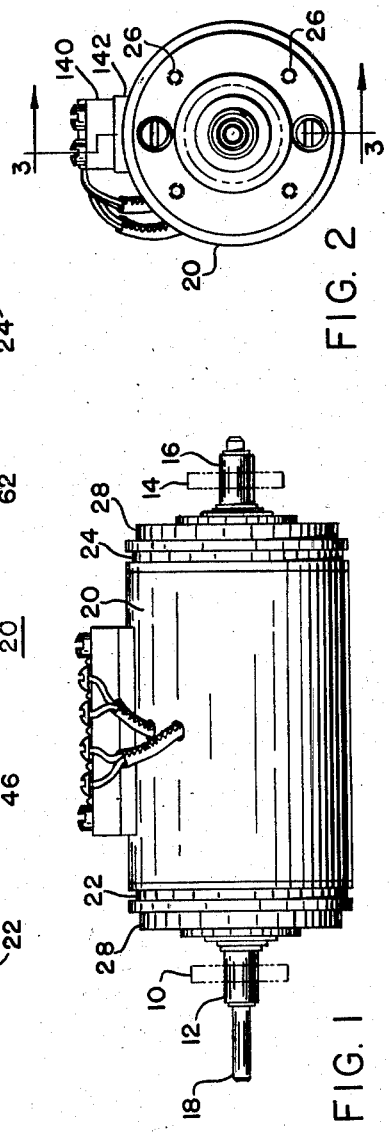
INVENTOR.
RUDOLPH E. BACHMAN
BY
Leonard H. King
AGENT

United States Patent Office 2,801,720
Patented Aug. 6, 1957

2,801,720

TRIPLEX MAGNETIC CLUTCH

Rudolph E. Bachman, Babylon, N. Y., assignor to Sterling Precision Instrument Corp., Flushing, N. Y.

Application March 21, 1955, Serial No. 495,406

7 Claims. (Cl. 192—48)

This invention relates to miniature electro-magnetic clutches and, in particular, to miniature plural function clutches.

It is an object of this invention to provide a light weight miniature clutch mechanism.

It is a different object of this invention to provide a clutch mechanism including a rotatable output shaft and means to selectively engage one of a plurality of rotatable input shafts.

Another object of this invention is to provide a simple precision high speed clutch mechanism.

A particular object of this invention is to provide a clutch mechanism having means to selectively engage either one or both of two independent mechanisms.

These and other objects, aspects and advantages will be in part pointed out and in part apparent from the following description considered in conjunction with the accompanying drawings which disclose the best mode currently contemplated for carrying out the invention.

In the drawings:

Figure 1 is a side elevation of a clutch embodying my invention.

Figure 2 is an end view of the clutch shown in Figure 1, and

Figure 3 is an enlarged central vertical longitudinal section through the same.

The devices of this invention may be employed in a variety of fashions. By way of example and with reference to Figure 1, gear 10, shown in phantom, may be used to drive hollow shaft 12 while gear 14, also shown in phantom, drives hollow shaft 16.

At the option of an operator or, automatically under the control of an electrical circuit either shaft 12 or 16 may be coupled to output shaft 18. Thus the clutch may be used as a speed selection means or, if shafts 12 and 16 rotate in opposite directions, the clutch may be used as a reversing means. Likewise shaft 18 may be used as an input means with either or both of hollow shafts 12 and 16 coupled thereto as the output means.

Housing 20 is provided with servo mount type coupling means 22 and 24. Alternatively, tapped holes 26 may be used as a mounting means. Diameter 28 serves as a pilot.

The internal construction may readily be understood by reference to the cross-sectional view of Figure 3. Housing 20 is formed of a magnetizable steel tubular member 32 to which are fitted end caps 34 and 36 which are shaped to conform to standard military type servo mounts. Retaining rings 38 and 40 fit into recesses 42 and 44 formed in the inner wall of tubular member 32. An assembly comprising an annular coil winding 46 and annular pole pieces 48 and 50 serves to clamp end piece 36 in place by means of screws 52 and 56 which mate with threaded bosses 58 and 60. A second assembly comprising winding 62 and pole pieces 64 and 66 serves to clamp end piece 34 in place by means of screws 68 and 70. Movement of pole pieces 48 and 64 is restrained by retaining rings 38 and 40.

Centrally located openings 72 and 74 provided in end members 34 and 36 respectively, receive ball bearings assemblies 76, 77, 78 and 79. Hollow shafts 12 and 16, formed of a magnetic material are supported by said bearings 76, 77, 78 and 79. It will be noted that the bearing assemblies and hollow shafts 12 and 16 are provided with stepped portions so that the addition of locking rings 86 and 88 in grooves 90 and 92 provide a completely captive assembly.

In turn, hollow shafts 12 and 16 are provided with pairs of bearing assemblies 94 and 95 and 96 and 97 respectively. A shaft 18 supported by bearings 94, 95, 96 and 97 extends through hollow shafts 12 and 16. The shaft 18 is retained by means of lock rings 100 and 102 set in grooves 104 and 106. Shims 108 may be used as required to compensate for manufacturing variations.

Actuator members 110 and 112 are slidably mounted on shaft 18 and rotate therewith due to leverage exerted by identical pins 114 and 115 positioned in slots 116 and 117. Slot 116 being shown in partial section. While pins 114 and 115 are shown at right angles to each other, their relative positions are not critical. A spacer 118 is provided between actuators.

Springs 120 and 122 acting against lock rings 124 and 126 respectively serve to move the actuators 110 and 112 toward each other. Lock rings 124 and 126 are set in grooves 128 and 130 in shaft 18.

When coils 46 and 62 are energized, magnetic fields, as shown by arrows 132 and 134 are created. The resulting fields cause magnetizable actuators 110 and 112 to close against face 136 and face 138, respectively, of hollow shafts 12 and 16. When thus engaged, the actuator causes the engaged hollow shaft to rotate.

Since coils 46 and 62 may be independently energized, either shaft 12 or 16 may be coupled to shaft 18 without interaction with the other, or optionally both shaft 12 and 16 may be coupled to shaft 18.

Terminal block 140 is mounted on the housing by means of concave supporting block 142 and screws 144 and 146. Suitable conductors 148 and 150 make connection from coils 46 and 62 respectively to terminal block 140.

While I have described and illustrated the best mode presently contemplated for carrying out my invention in such manner that the same may be readily understood by those skilled in the art, I am aware that changes may be made in the details disclosed without departing from the spirit of the invention as expressed in the following claims.

What I claim as new is:

1. A clutch mechanism comprising in combination: a first shaft, a rotatable hollow second shaft mounted coaxially on said first shaft, a first radially deployed clutch face arranged to rotate with said second shaft, a rotatable hollow third shaft member mounted coaxially on said first shaft, a second radially deployed clutch face arranged to rotate with said third shaft, a first magnetizable actuator member provided with a cylindrical bore and a radially deployed slot extending from said bore mounted coaxially on said first shaft so that said first shaft extends through said first actuator bore, a second magnetizable actuator member provided with a cylindrical bore and a radially deployed slot extending from said bore mounted coaxially on said first shaft so that said first shaft extends through said second actuator bore, a first pin mounted on said shaft and positioned in said first actuator slot, a second pin mounted on said shaft and positioned in said second actuator shaft slot, a third clutch face parallel to said first clutch face carried by said first actuator, a fourth clutch face parallel to said second clutch face carried by said second actuator, a first annular coil winding coaxially positioned with respect to said first actuator, so that when said first coil windings is electrically energized the resulting magnetic field will cause said first actuator to axially slide on said first shaft until said first and third clutch faces are engaged so as to cause said hollow second shaft to rotate with said first shaft, a second annular coil coaxially positioned with respect to said second actuator so that when said second coil winding is electrically energized the resulting magnetic field will cause said second actuator to axially slide on said first shaft until said second and fourth clutch faces are engaged so as to cause said hollow third shaft to rotate with said first shaft, and spring means to separate said first and third and said second and fourth clutch faces when said coil windings are de-energized.

2. A clutch mechanism comprising in combination: a tubular housing member, first and second end members provided with a centrally located bearing receiving opening affixed to each end of said housing member, bearing members positioned in said bearing openings, a first hollow shaft rotatably supported in the said bearings of one of said end members and a second hollow shaft rotatably supported in the said bearing member of the other said end member, means for preventing axial displacement of said first and second hollow shafts, a third shaft coaxially supported by said hollow shafts, means for preventing axial displacement of said third shaft, a clutch face extending in a plane perpendicular to the axis of said shafts attached to each of said first and second shaft and arranged to rotate therewith, a first actuator member provided with a clutch face parallel to said first shaft clutch face, a bore and a slot extending from said bore, said first actuator being slidably mounted on said third shaft with said third shaft extending through said bore, a pin extending from said shaft and positioned in said first actuator slot, a second actuator member provided with a clutch face parallel to said second shaft clutch face, a bore and a slot extending from said bore, said second actuator being slidably mounted on said third shaft, with said third shaft extending through said bore, a pin extending from said shaft and positioned in said second actuator slot, a first annular coil winding coaxially positioned with respect to said first actuator so that when said first coil winding is energized the resulting magnetic field causes said first actuator to move axially on said third shaft until said first actuator clutch face engages said first shaft clutch face so as to cause said first shaft to rotate with said third shaft, spring means to keep said first actuator clutch face and said first shaft clutch face separate when said first coil winding is de-energized, a second annular coil winding coaxially positioned with respect to said second actuator so that when said second coil winding is energized the resulting magnetic field causes said second actuator to move axially on said third shaft until said second actuator clutch face engages said second shaft clutch face so as to cause said second shaft to rotate with said third shaft, and spring means to keep said second actuator clutch face and said second shaft clutch face separated when said second coil winding is de-energized.

3. A clutch mechanism comprising in combination: a tubular housing member, first and second end members provided with a centrally located bearing receiving opening affixed to each end of said housing member, bearing members positioned in said bearing openings, a first hollow shaft rotatably supported in the said bearings of one of said end members and a second hollow shaft rotatably supported in the said bearing member of the other said end member, means for preventing axial displacement of said first and second hollow shafts, a third shaft coaxially supported by said hollow shafts, means for preventing axial displacement of said third shaft, a clutch face extending in a plane perpendicular to the axis of said shafts attached to each of said first and second shaft and arranged to rotate therewith, a first actuator member provided with a clutch face parallel to said first shaft clutch face, a bore and a slot extending from said bore, said first actuator being slidably mounted on said third shaft with said third shaft extending through said bore, a pin extending from said shaft and positioned in said first actuator slot, a second actuator member provided with a clutch face parallel to said second shaft clutch face, a bore and a slot extending from said bore, said second actuator being slidably mounted on said third shaft, with said third shaft extending through said bore, a pin extending from said shaft and positioned in said second actuator slot, a first annular coil winding coaxially positioned with respect to said first actuator so that when said first coil winding is energized the resulting magnetic field causes said first actuator to move axially on said third shaft until said first actuator clutch face engages said first shaft clutch face so as to cause said first shaft to rotate with said third shaft, spring means to keep said first actuator clutch face and said first shaft clutch face separate when said first coil winding is de-energized, a second annular coil winding coaxially positioned with respect to said second actuator so that when said second coil winding is energized the resulting magnetic field causes said second actuator to move axially on said third shaft until said second actuator clutch face engages said second shaft clutch face so as to cause said second shaft to rotate with said third shaft, spring means to keep said second actuator clutch face and said second shaft clutch face separate when said second coil winding is de-energized, a first annular core member affixed to said first coil winding, a first annular ring affixed to the inside of said tubular member and positioned between said core member and said end member, screw means for clamping said first annular core member and said first end member against said first annular ring, a second annular core member affixed to said second coil winding, a second annular ring affixed to the inside of said tubular member and positioned between said second annular core member and said second end member, and screw means for clamping said second core member and said second end member to said second annular ring.

4. A clutch mechanism comprising in combination: a tubular housing member, first and second end members provided with a centrally located bearing receiving opening affixed to each end of said housing member, bearing members positioned in said bearing openings, a first hollow shaft rotatably supported in the said bearings of one of said end members and a second hollow shaft rotatably supported in the said bearing member of the other said end member, means for preventing axial displacement of said first and second hollow shaft, a third shaft coaxially supported by said hollow shafts, means for preventing axial displacement of said third shaft, a clutch face extending in a plane perpendicular to the axis of said shafts attached to each of said first and second shaft and arranged to rotate therewith, a first actuator member provided with a clutch face parallel to said first shaft clutch face, a bore and a slot extending from said bore, said first actuator being slidably mounted on said third shaft with said third shaft extending through said bore, a pin extending from said shaft and positioned in said first actuator slot, a second actuator member provided with a clutch face parallel to said second shaft clutch face, a bore and a slot extending from said bore, said second actuator being slidably mounted on said third shaft, with said third shaft extending through said bore, a pin extending from said shaft and positioned in said second actuator slot, a first annular coil winding coaxially positioned with respect to said first actuator so that when said first coil winding is energized the resulting magnetic field causes said first actuator to move axially on said third shaft until said first actuator clutch face engages said first shaft clutch face so as to cause said first shaft to rotate with said third shaft, spring means to keep said first actuator clutch face and said first shaft clutch face separate when said first coil winding is de-energized, a second annular coil winding coaxially positioned with respect to said second actuator so that when second coil winding is energized the resulting magnetic field causes said second actuator to move axially on said third shaft until said second actuator clutch face engages said second shaft clutch face so as to cause said second shaft to rotate with said third shaft, spring means to keep said second actuator clutch face and said second shaft clutch face separated when said second coil winding is de-energized, a first annular core member affixed to said first coil winding, a first annular ring affixed to the inside of said tubular member and positioned between said core member and said end member, screw means for clamping said first annular core member and said first end member against said first annular ring, a second annular core member affixed to said second coil winding, a second annular ring affixed to the inside of said tubular member and positioned between said second annular core member and said second end member, and screw means for clamping said second core member and said second end member to said second annular ring, wherein said spring means comprise lock rings affixed to said third shaft and helical coil springs surrounding said third shaft and compressed between said actuators and said lock rings.

5. A clutch mechanism comprising in combination: a tubular housing member, first and second servo mount end members provided with a centrally located bearing receiving opening affixed to each end of said housing member, bearing members positioned in said bearing openings, a first hollow shaft rotatably supported in the said bearings of one of said end members and a second hollow shaft rotatably supported in the said bearing member of the other said end member, means for preventing axial displacement of said first and second hollow shafts, a third shaft coaxially supported by said hollow shafts, means for preventing axial displacement of said third shaft, a clutch face extending in a plane perpendicular to the axis of said shafts attached to each of said first and second shaft and arranged to rotate therewith, a first actuator member provided with a clutch face parallel to said first shaft clutch face, a bore and a slot extending from said bore, said first actuator being slidably mounted on said third shaft with said third shaft extending through said bore, a pin extending from said shaft and positioned in said first actuator slot, a second actuator member provided with a clutch face parallel to said second shaft clutch face, a bore and a slot extending from said bore, said second actuator being slidably mounted on said third shaft, with said third shaft extending through said bore, a pin extending from said shaft and positioned in said second actuator slot, a first annular coil winding coaxially positioned with respect to said first actuator so that when said first coil winding is energized the resulting magnetic field causes said first actuator to move axially on said third shaft until said first actuator clutch face engages said first shaft clutch face so as to cause said first shaft to rotate with said third shaft, spring means to keep said first actuator clutch face and said first shaft clutch face separate when said first coil winding is de-energized, a second annular coil winding coaxially positioned with respect to said second actuator so that when said second coil winding is energized the resulting magnetic field causes said second actuator to move axially on said third shaft until said second actuator clutch face engages said second shaft clutch face so as to cause said second shaft to rotate with said third shaft, and spring means to keep said second actuator clutch face and said second shaft clutch face separated when said second coil winding is de-energized.

6. A clutch mechanism comprising in combination: a tubular housing member, first and second servo mount end members provided with a centrally located bearing receiving opening affixed to each end of said housing member, bearing members positioned in said bearing openings, a first hollow shaft rotatably supported in the said bearings of one of said end members and a second hollow shaft rotatably supported in the said bearing member of the other said end member, means for preventing axial displacement of said first and second hollow shafts, a third shaft coaxially supported by said hollow shafts, means for preventing axial displacement of said third shaft, a clutch face extending in a plane perpendicular to th axis of said shafts attached to each of said first and second shaft and arranged to rotate therewith, a first actuator member provided with a clutch face parallel to said first shaft clutch face, a bore and a slot extending from said bore, said first actuator being slidably mounted on said third shaft with said third shaft extending through said bore, a pin extending from said shaft and positioned in said first actuator slot, a second actuator member provided with a clutch face parallel to said second shaft clutch face, a bore and a slot extending from said bore, said second actuator being slidably mounted on said third shaft, with said third shaft extending through said bore, a pin extending from said shaft and positioned in said second actuator slot, a first annular coil winding coaxially positioned with respect to said first actuator so that when said first coil winding is energized the resulting magnetic field causes said first actuator to move axially on said third shaft until said first actuator clutch face engages said first shaft clutch face so as to cause said first shaft to rotate with said third shaft, spring means to keep said first actuator clutch face and said first shaft clutch face separate when said first coil winding is de-energized, a second annular coil winding coaxially positioned with respect to said second actuator so that when said second coil winding is energized the resulting magnetic field causes said second actuator to move axially on said third shaft until said second actuator clutch face engages said second shaft clutch face so as to cause said second shaft to rotate with said third shaft, spring means to keep said second actuator clutch face and said second shaft clutch face separated when said second coil winding is de-energized, a first annular core member affixed to said first coil winding, a first annular ring affixed to the inside of said tubular member and positioned between said core member and said end member, screw means for clamping said first annular core member and said first end member against said first annular ring, a second annular core member affixed to said second coil winding, a second annular ring affixed to the inside of said tubular member and positioned between said second annular core member and said second end member, and screw means for clamping said second core member and said second end member to said second annular ring.

7. A clutch mechanism comprising in combination: a first shaft, a rotatable hollow second shaft mounted coaxially on said first shaft, a first radially deployed clutch face arranged to rotate with said second shaft, a rotatable hollow third shaft member mounted coaxially on said first shaft, a second radially deployed clutch face arranged to rotate with said third shaft, a first magnetizable actuator member provided with a cylindrical bore and a radially deployed slot extending from said bore mounted coaxially on said first shaft so that said first shaft extends through said first actuator bore, a second magnetizable actuator member provided with a cylindrical bore and a radially deployed slot extending from said bore mounted coaxially on said first shaft so that said first shaft extends through said second actuator, bore, a first pin mounted on said shaft and positioned in said first actuator slot, a second pin mountd on said shaft and positioned in said second actuator shaft slot, a third clutch face parallel to said first clutch face carried by said first actuator, a fourth clutch face parallel to said second clutch face carried by said second actuator, a first annular coil winding coaxially positioned with respect to said first actuator, so that when said first coil winding is electrically energized the resulting magnetic field will cause said first actuator to axially slide on said first shaft until said first and third clutch faces are engaged so as to cause said hollow second shaft to rotate with said first shaft, a second annular coil coaxially positioned with respect to said second actuator so that when said second coil winding is electrically energized the resulting magnetic field will cause said second actuator to axially slide on said first shaft until said second and fourth clutch faces are engaged so as to cause said hollow third shaft to rotate with said first shaft, spring means to separate said first and third and said second and fourth clutch faces when said coil windings are de-energized, a pair of spaced servo mount means provided with centrally positioned bearings, for rotatably supporting said first shaft, and a housing extending between said pair of spaced servo mounts.

References Cited in the file of this patent

UNITED STATES PATENTS

| | | |
|---|---|---|
| 1,697,595 | Henderson | Jan. 1, 1929 |
| 2,253,309 | Smellie | Aug. 19, 1941 |
| 2,490,044 | Garbarini et al. | Dec. 6, 1949 |